Jan. 15, 1935.  W. DEPENBROCK  1,988,072
PENDULUM WEIGHING MACHINE
Filed Sept. 4, 1931  4 Sheets-Sheet 2

Jan. 15, 1935.  W. DEPENBROCK  1,988,072
PENDULUM WEIGHING MACHINE
Filed Sept. 4, 1931  4 Sheets-Sheet 4
Fig. 4
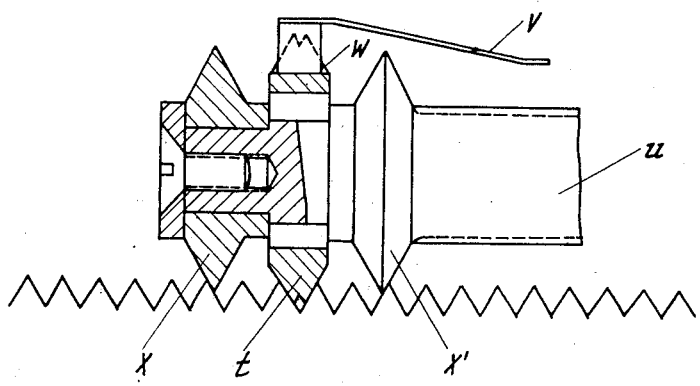
Fig. 5
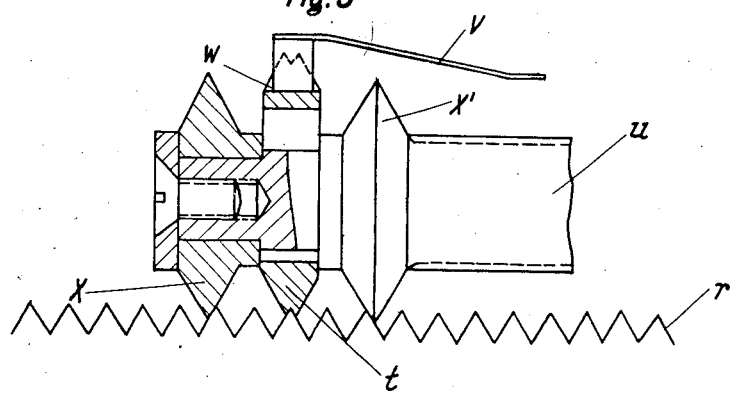
Fig. 6
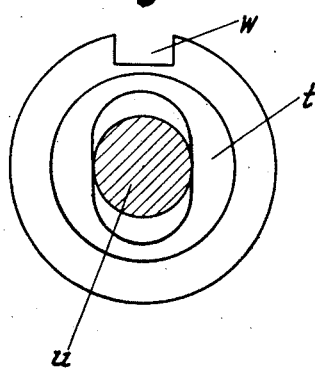
Fig. 7
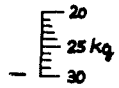
Fig. 8
0.30 kg Patented Jan. 15, 1935

1,988,072

UNITED STATES PATENT OFFICE 1,988,072

PENDULUM WEIGHING MACHINE

Wilhelm Depenbrock, Kreuznach, Germany, assignor to Seitz-Werke G. m. b. H., Kreuznach, Germany, a firm Application September 4, 1931, Serial No. 561,236
In Germany June 6, 1931

10 Claims. (Cl. 265—5)

I have filed an application in Germany, S. 99 083 IX/42 f, 6. 6. 1931.

Pendulum weighing machines with means for printing the weight are frequently provided with a printed scale, on which the exact weight is indicated by means of a pointer which is also actuated by the printing mechanism.

On the other hand, and especially in the case of machines for weighing individuals, type printing is sometimes employed. In such case, several weights usually appear one above another, and the weight approximates most closely to the value which is disposed in the middle and shows the strongest impression.

The subject of the invention is a weighing machine by means of which the weight recorded by type printing is automatically rounded off, within the margin of error in adjustment, in such a way that either only that weight which is nearest the true weight is printed in round figures or else rounded off subdivisions of the weight unit employed are also printed. The invention consists in that the setting disc from which the value of the ascertained weight is transmitted for setting the printing type, is combined with a compensating device which adjusts the stepped disc and type wheel to a round number which lies within the range determined by the requisite rounding-off and the permissible error in adjustment. This rounding-off, however, does not affect the position of the finder, which therefore still continues to indicate the exact weight.

Figure 1:
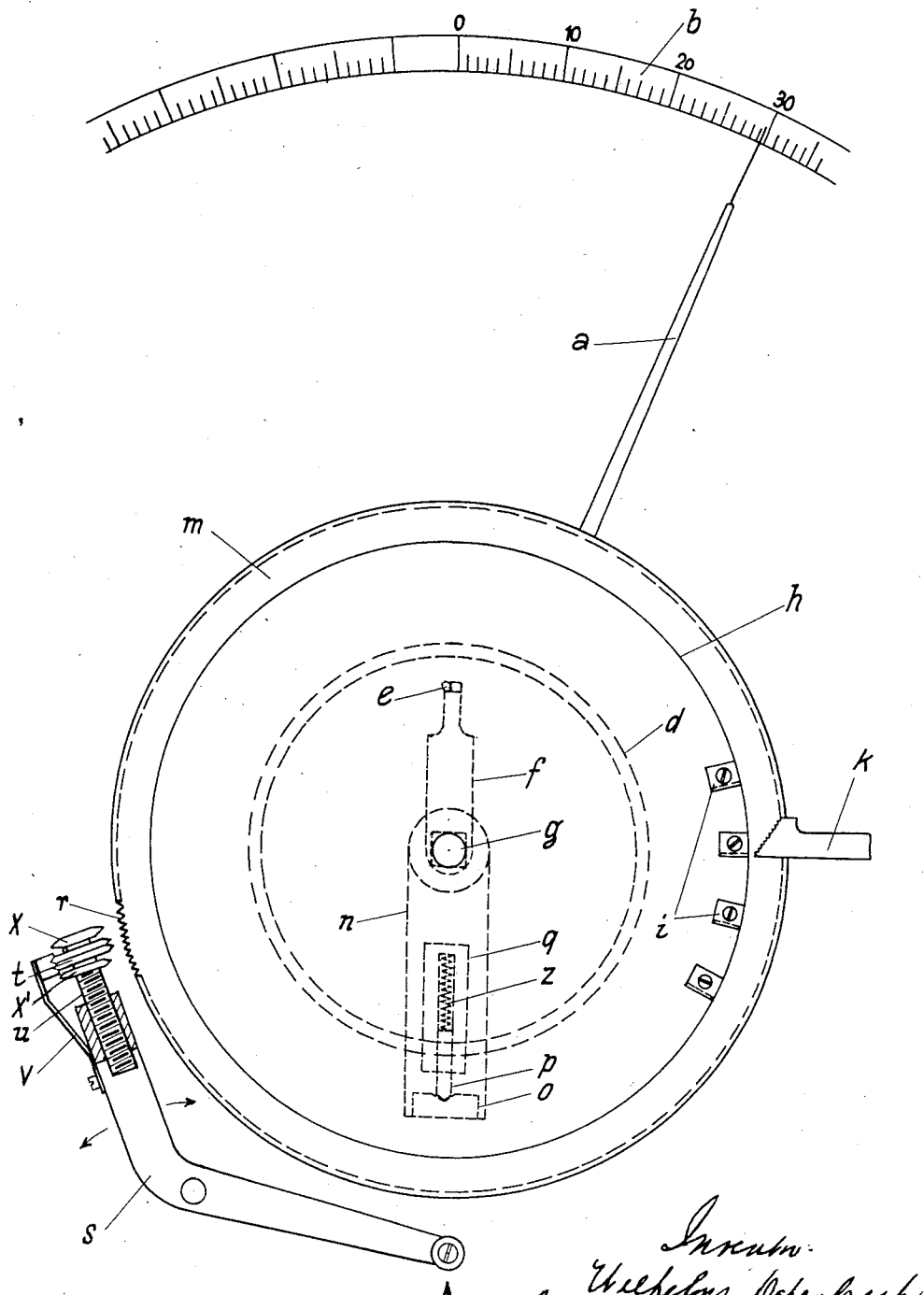
Figure 2:
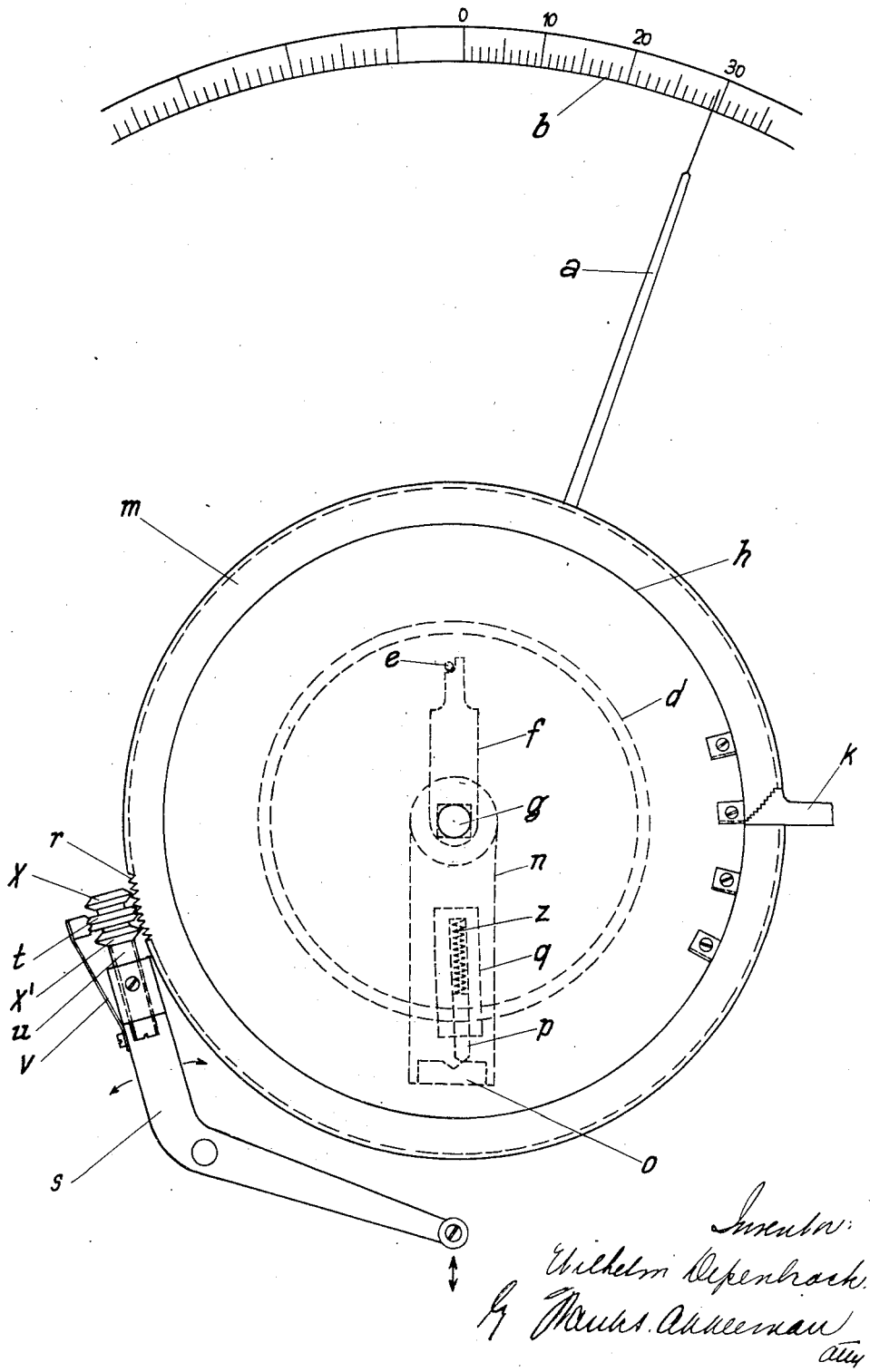
Figure 3:
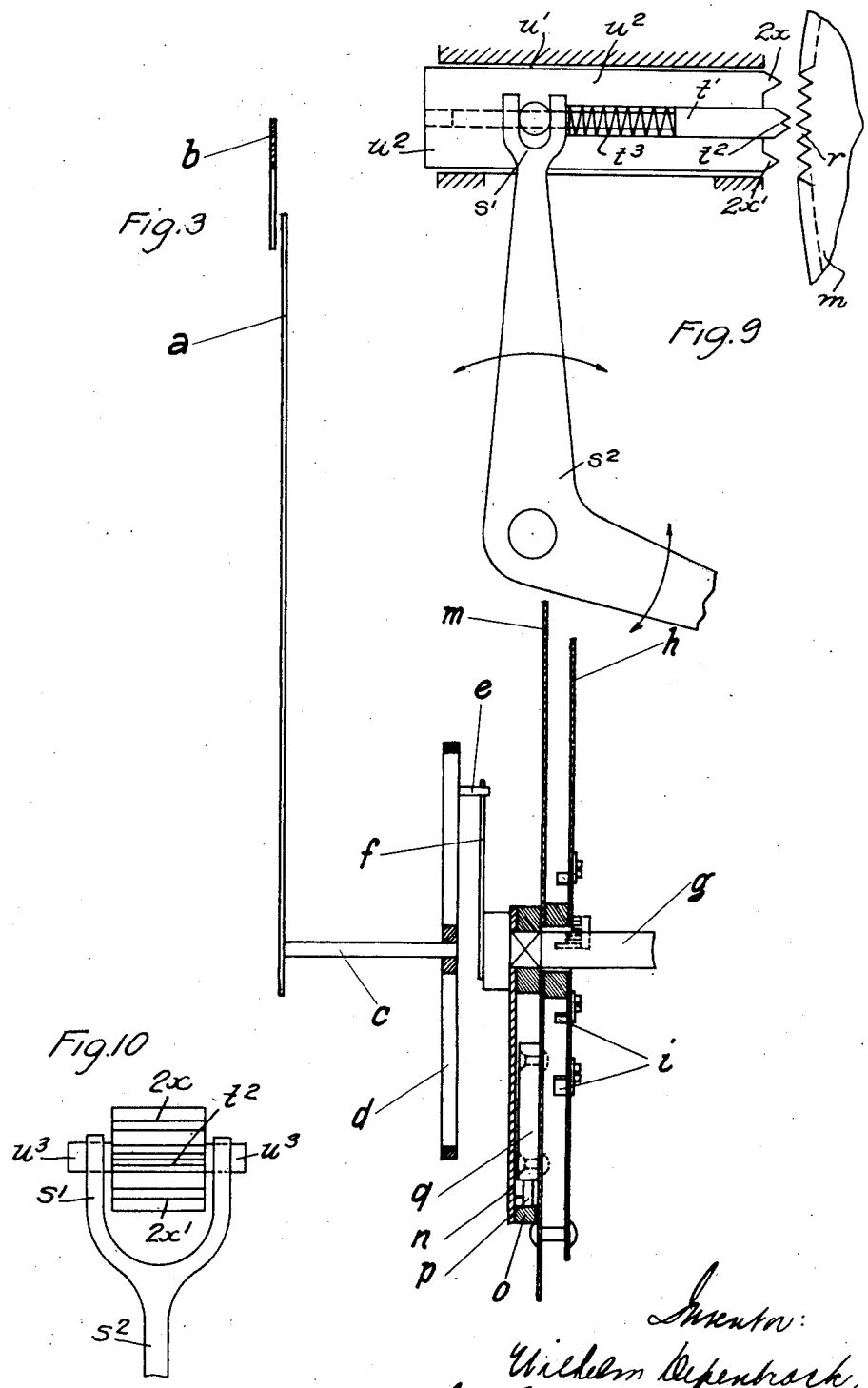

Typical embodiments of the invention are illustrated in the drawings, in which Figs. 1 and 2 represent a front elevation of the essential parts, in two different positions, Fig. 3 a corresponding side elevation, Figs. 4 and 5 the main members of the rounding-off device, on a larger scale and in different operative positions, Fig. 6 a detail of said rounding-off device, and Figs. 7 and 8 different specimens of the printing of the weight. Figs. 9 and 10 are respectively a detail side elevation showing a modification of the rounding off device and associated parts, and an end view of the rounding off device.

As is evident from the position of the pointer in Figs. 1 and 2, the correct weight of the article in position on the weighing machine is, for example, nearly 30 kg. The example given is a 500 kg. machine (of the kind used on the German State Railway) in which in general the weight is required to be rounded off to the nearest whole number. In the case of machines adapted for a smaller maximum load, it is also possible to use the same principle to round off and print subdivisions such as 100 gr. units. The object of the device according to the invention is to adjust the printing type in such a manner that only the weight rounded-off to a whole number of kilogrammes or subdivisions thereof is printed.

The pointer $a$ which travels in front of the scale $b$ is mounted on the rotatable shaft $c$ (Fig. 3) which is actuated from the weighing mechanism and the rear end of which is provided with the clutch plate $d$, which is stopped, in known manner, at each printing operation, so that the printing mechanism can continue to move and make the impression. With this object the clutch plate is provided with a driver $e$, which coacts with the follower arm $f$ fixed on the shaft $g$, which is operatively connected with the printing apparatus. This shaft $g$ carries, first of all, the stop disc $h$, provided with the requisite steps $i$ from which the value of the weight indicated by the machine is transmitted by means of a feeler $k$. The disc $h$ is integrally connected with the balance disc $m$, and both the discs $h$ and $m$ are rotatably mounted on the shaft $g$. The movements imparted to the shaft $g$ by the driver $e$ and follower arm $f$ are transmitted by flexible members, such as the lever $n$, mounted on a squared portion of the shaft $g$ and provided, on its free end, with a dished lug $o$. This dished lug $o$ is engaged by a driver pin $p$, which is movable radially in a spring sleeve $q$ attached on the balance disc $m$, and is urged outwardly by a spring $z$. The pin terminates, at its outermost end, in a knife-edge tip which engages accurately in the dished lug.

As shown in Figs. 1 and 2, and on a larger scale in Figs. 4 and 5, the balance disc $m$ is provided with a toothed rim $r$, which is engaged by the balance lever $s$, the front end of which carries the ring $t$, provided with two knife edges. The distance between the two knife edges of the ring $t$ bears a definite relation to the spacing of the teeth $r$ on the rim of the disc $m$, and this relationship must be calculated for each maximum load and rounding off. The result of this arrangement is that, on the lever $s$ being pressed against the disc $m$, the two knife edges of the ring $r$ either engage jointly in a gap between the teeth $r$ (as shown in Fig. 4), or jointly engage the edge of a tooth (as shown in Fig. 5). By means of a slot, the ring $t$ (Fig. 6) surrounds the pin $u$, which is fitted into the balance lever $s$ by means of a fine thread. At the same time, there is attached to the lever $s$ a flat spring $v$ which engages in a corresponding recess $w$ in the ring $t$ and, on the one hand, prevents the ring from turning, and also keeps the ring pressed into the one end position. On either side of the double knife edge ring $t$ are provided other knife-edge rings $x$, $x'$, equidistant from the ring $t$ and separated by a distance equivalent to an odd multiple of half the spacing of the teeth $r$ on the balance disc $m$. The ring $x'$ is integral with the pin $u$, whilst the ring $x$ is connected, by suitable means, with the pin $u$, in such a manner that the rings $x$ and $x'$ enclose the ring $t$ between them and prevent it from shifting in the direction of the longitudinal axis of the pin $u$.

It may also be mentioned that, after the pointer has swung, the stopping of the clutch disc $d$, the pressing of the balance lever $s$ into contact, and finally, the advance of the feeler lever $k$, are effected, in succession, by means of any known mechanism, for example by cams such as are shown in the patent to G. R. Wood, dated March 11, 1930 No. 1,750,207 wherein such cams are shown on the main cam shaft of a pair of scales.

The following method of operating is obtained. For the purposes of the present example, the weight of the object is assumed to be nearly 30 kg., but the printing mechanism is to record 30 kg. exactly. The shaft $c$ and the clutch plate $d$ are rotated with the pointer $a$, which indicates the true weight, the clutch plate being then arrested in any known manner. As already mentioned, the follower arm $f$ now bears against the driver $e$ of the clutch plate and brings the stop-disc shaft $g$ into a corresponding position. The lever $n$ and dished lug $o$ are rotated with the shaft $g$, and, the lug $o$ being engaged by the spring-controlled pin $p$ radially movable with respect to the balance disc $m$, this latter disc and with it the stop disc $h$ is caused to take up a corresponding position. The rounding-off device now comes into operation, in that the lever $s$ is pressed against the disc $m$. In the first place, the ring $t$, with the double knife edges, engages with the teeth $r$ on the balance disc $m$, and turns said disc in such a manner as to bring it either into the position shown in Fig. 4 or in that according to Fig. 5. In this manner, the balance disc $m$ and therefore the stop disc $h$, are brought into such a position that the feeler $k$ can give in the example under discussion a complete kilogram value, in the present case 30 kg. or in the case of weighing machines having a smaller maximum load the rounded off value may be in submultiple of a kilogram. Shortly after the ring $t$ has come into engagement, the resulting adjustment of the balance disc $m$ is fixed and rendered more accurate by the other two knife-edge rings $x$ and $x'$ which engage laterally with adjacent teeth on the disc $m$. By turning the pin $u$ in the lever $s$ the rounding-off device can be adjusted directly, in such a manner that, in all cases, it sets the stop disc $h$ in position for printing the desired weight, with a degree of accuracy corresponding to the desired rounding-off and margin of error in adjustment. The rounding-off of the balance disc and stop disc does not, in any way, alter the adjustment of the pointer $a$, which records the true weight without rounding off, since the pin $p$, which effect the connection of the disc $m$ with the lever $n$ can shift slightly out of the central position of the lug $o$, as shown in Fig. 2, which shows the final adjustment of the several parts during the printing operation.

After the printing has been performed and the feeler $k$ has moved back, the balance lever $s$ is returned into the position shown in Fig. 1, so that the balance disc $m$ and the stop disc $h$ are able to move back into the position in which the pin $p$ engages in the centre of the member $o$. After the check on the clutch disc $d$ has been relieved, the pointer $a$ and printing mechanism also return into neutral position.

It is self-evident that the spacing of the two knife edges on the ring $t$ of the rounding-off device is of importance in connection with the rounding-off of the true weight, in either the upward or downward direction. The two knife edges must be spaced in such a manner that the separation stands in a definite calculable relationship to the division on the periphery of the balance disc $m$ taking into account the permissible rounding-off and the margin of error in adjustment.

A particular advantage of providing the ring $t$ of the rounding-off device with two knife edges consists in that, in the case of a 500 kg. weighing machine, in which the true weight must always be rounded-off to a complete kg. for printing, there need only be 250 teeth $r$, since the rounding-off can be effected in the tooth gaps as well as on the ridges of the teeth. In such case, the teeth may be considerably thicker and larger, and will therefore be stronger and more easily machined.

The invention is, of course, not strictly limited to the typical embodiment shown. In particular, the annular knife edges of the rounding-off device may, if desired, be replaced by any other rectilinear knife edges, the adjustment of which in relation to the lever $s$ would have to be effected by means of a suitable adjusting device. Such a modification of the invention is shown in Figures 9 and 10, wherein a guide $u'$ supports a slide $u^2$ having trunnions $u^3$ which are engaged by a fork $s'$ on a lever $s^2$ corresponding with and acting in the same manner as the lever $s$ of the previous form. Teeth $2x$ and $2x'$ are provided on the forward corners of the slide to correspond with the parts $x$ and $x'$ of the previous form. A slot $u^4$ is formed in the forward end of the slide and a plunger $t'$ is slidably mounted in this slot and is provided with a notched or double toothed end $t^2$ corresponding to the part $t$ of the previous form. A spring $t^3$ urges this plunger towards the disc $m$ to engage the teeth $r$ thereon.

According to the requisite rounding off and the established margin of error in adjustment, the separations of the four knife edges (double knife-edge $t$ and lateral knife edges $x$, $x'$) and the number of teeth on the balance disc $m$ vary. These values must be determined by calculation for each maximum load.

What I claim is:

1. A pendulum weighing machine comprising in combination, a printing device, a stepped disc therefor, a compensating toothed disc rigidly connected to said stepped disc, a balance lever, and two pairs of knife edges on said lever to cooperate with said toothed disc to give a rounded-off printed indication, one pair of said knife edges being spaced to enter adjacent spaces between the teeth of said disc and the remaining knife edges being spaced at fractional tooth distances from the first knife edges.

2. A pendulum weighing machine according to claim 2, characterized by having an arm of said lever provided with an adjustable extension carrying the knife edges.

3. A pendulum weighing machine provided with type-printing-means and a rounding-off device for the printing-mechanism, consisting of a setting disc provided with stops and constituting a stop disc, a toothed disc connected to said stop disc and a knife-edge-lever cooperating therewith, characterized in that the rounding-off device is provided with a plurality of knife-edges, of which when pressure is exerted at least one engages the toothed disc wherein the distance between the knife-edges is so dimensioned that the stop-disc and the elements of the printing mechanism connected therewith are under all circumstances set upon a rounded-up value nearest to that of the actually indicated weight, the setting being adjusted without changing the position of the indicator which continues to indicate the exact weight.

4. The pendulum weighing machine of claim 3, characterized in that the compensating device is provided with three knife edges of which, when the compensating device is pressed forward, the one in the middle engages the toothed disc ahead of the two spaced at the sides equivalent to an odd multiple of half of the spacing of the teeth of the balance disc.

5. The pendulum weighing machine of claim 3, characterized in that the compensating device is provided with three knife edges of which, when the compensating device is pressed forward, the one in the middle engages the toothed disc ahead of the two spaced at the sides equivalent to an odd multiple of half of the spacing of the teeth of the balance disc, at least one of said knife edges being a double knife edge.

6. The machine of claim 3, characterized in that there is provided an element of the compensating device which carries the knife edges and is fitted into the balance lever by means of a fine thread in order to enable accurate adjustment.

7. The machine of claim 3, characterized in that the knife edge in the middle which engages ahead of the others is shaped as a ring, which is mounted by means of a longitudinal slot upon a pin which also carries the other knife edges and which are likewise shaped like rings, and that the knife edge in the middle is secured against turning by means of a flat spring attached to the balance lever and moreover urged into such position that it engages ahead of the other knife edges.

8. The machine of claim 3 characterized by having means to lock the pointer in its position, and an elastic coupling element between said pointer and the toothed balance disc movable during the rounding off action in such manner that through adjusting of the toothed balance disc no disadvantageous effect upon the pointer is produced.

9. The machine of claim 3, characterized in that the pointer which shows the correct weight is locked in its position and by means of elastic elements is coupled to the toothed balance disc and the stepped disc connected therewith during the printing action in such manner that through adjusting of the toothed balance disc no disadvantageous effect upon the pointer is produced, the machine being further characterized by having a pin arranged at the toothed balance disc and radially displaceable against a spring, which by means of its sharpened point engages a pan-shaped lug whose setting is dependent upon the setting of the pointer, with the result that during the rounding-up action the pin and the lug become displaced toward each other, while the position of the pointer is not affected by the rounding-up action.

10. The machine of claim 3, characterized in that the pointer which shows the correct weight is locked in its position and by means of elastic elements is coupled to the toothed balance disc and the stepped disc connected therewith during the printing action in such manner that through adjusting of the toothed balance disc no disadvantageous effect upon the pointer is produced, the machine being further characterized by having a pin arranged at the toothed balance disc and radially displaceable against a spring, which by means of its sharpened point engages a pan-shaped lug whose setting is dependent upon the setting of the pointer, with the result that during the rounding-up action the pin and the lug become displaced toward each other, while the position of the pointer is not affected by the rounding-up action, said pan-shaped lug being by means of a follower arm coupled to a driver element of the shaft during the printing operation.

WILHELM DEPENBROCK.